US012006981B2

(12) United States Patent
Barthelme et al.

(10) Patent No.: US 12,006,981 B2
(45) Date of Patent: Jun. 11, 2024

(54) NON-LOCATING BEARING ASSEMBLY

(71) Applicant: AKTIEBOLAGET SKF, Gothenburg (SE)

(72) Inventors: Juergen Barthelme, Grettstadt (DE); Helmut Hauck, Euerbach (DE); Stefanie Seufert, Rothhausen (DE); Alexander Dilje, Schweinfurt (DE); Hans-Juergen Friedrich, Königsberg-Römershofen (DE); Sebastian Kraus, Schwanfeld (DE); Andreas Herbert Kraus, Bergrheinfeld (DE); Berthold Beyfuss, Wasserlosen-Kaisten (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/824,935

(22) Filed: May 26, 2022

(65) Prior Publication Data

US 2022/0389969 A1 Dec. 8, 2022

(30) Foreign Application Priority Data

Jun. 8, 2021 (DE) .......................... 102021205788.8

(51) Int. Cl.
*F16C 35/06* (2006.01)
*F16C 27/06* (2006.01)
*F16C 35/067* (2006.01)
*F16C 35/07* (2006.01)
*F16C 35/077* (2006.01)
*F16C 39/02* (2006.01)
*F16C 35/04* (2006.01)

(52) U.S. Cl.
CPC ............ *F16C 35/06* (2013.01); *F16C 27/066* (2013.01); *F16C 35/067* (2013.01); *F16C 35/077* (2013.01); *F16C 39/02* (2013.01); *F16C 35/045* (2013.01)

(58) Field of Classification Search
CPC ........ F16C 25/08; F16C 25/083; F16C 27/04; F16C 27/06; F16C 27/066; F16C 35/045; F16C 35/06; F16C 35/067; F16C 35/07; F16C 35/077; F16C 39/02
See application file for complete search history.

(56) References Cited

U.S. PATENT DOCUMENTS

| 3,749,463 | A | * | 7/1973 | Krapf | .................... | F16C 35/077 |
| | | | | | | 384/539 |
| 4,046,432 | A | * | 9/1977 | Hofmann | .............. | F16C 35/067 |
| | | | | | | 384/510 |
| 7,001,293 | B2 | * | 2/2006 | Lubben | ................. | F16C 35/067 |
| | | | | | | 474/8 |

(Continued)

Primary Examiner — Alan B Waits
(74) Attorney, Agent, or Firm — J-TEK LAW PLLC; Scott T. Wakeman; Mark A. Ussai

(57) ABSTRACT

A non-locating bearing assembly includes a bearing unit configured to support a rotating component relative to a stationary component, and the bearing unit includes a first stationary bearing ring and a second rotatable bearing ring that is fixedly connectable to the rotating component. The bearing assembly also includes a bearing carrier to which the stationary bearing ring is attached in a rotationally fixed but axially displaceable manner, and the bearing carrier is configured to be fixedly connected to the stationary component.

9 Claims, 5 Drawing Sheets

(56) References Cited

U.S. PATENT DOCUMENTS

| | | | |
|---|---|---|---|
| 8,840,312 B1* | 9/2014 | Fisher | H02K 5/1732 |
| | | | 384/537 |
| 2015/0345550 A1* | 12/2015 | Beck | F16C 19/06 |
| | | | 384/563 |
| 2019/0032706 A1* | 1/2019 | Isaji | H02K 5/1732 |

* cited by examiner

NON-LOCATING BEARING ASSEMBLY

CROSS-REFERENCE

This application claims priority to German patent application no. 10 2021 205 788.8 filed on Jun. 8, 2022, the contents of which are fully incorporated herein by reference.

TECHNOLOGICAL FIELD

The present disclosure is directed to a non-locating bearing assembly that includes a bearing carrier for supporting a bearing ring in an axially displaceable and substantially rotationally fixed manner.

BACKGROUND

Non-locating bearing assemblies are always used when a stationary bearing ring of a bearing unit is to be movably supported axially relative to a component receiving the bearing unit. Such an axial displacement is necessary in particular when different heat expansion coefficients prevail between the stationary component and the bearing. These different thermal expansions lead to a variable fit between the stationary bearing ring and the stationary component, and this can lead to damage to the bearing or the stationary component when they are not compensated for.

The reason for this is that this variable fit causes the bearing ring that is supposed to be stationary to co-rotate with the rotating bearing ring. This creeping or co-rotation of the stationary bearing ring then leads to damage to the bearing and must therefore be prevented.

It is also problematic that the variable fit can also lead to a blockage of the axial displaceability, which negatively influences or damages not only the bearing but the entire component to which the non-locating bearing assembly is attached.

In order to in particular counter the different thermal expansions, in the prior art it has been proposed to provide the stationary component with a so-called inlay that has the same thermal expansion properties as the stationary bearing ring. Thus it has been proposed in particular to introduce a steel ring between a bearing ring and a stationary component, which steel ring, however, can be introduced into the stationary component only at high expense, such as, for example, by welding, soldering, adhering, screwing, or in-situ injecting. In addition, this ring must subsequently be machined and matched to all individual elements so that the tolerances of all elements can be set. However, this requires a very high installation expense, which in turn leads to high costs.

SUMMARY

An aspect of the present disclosure is therefore to provide a non-locating bearing assembly that provides a rotational securing, an axial clearance reduction, and a temperature expansion compensation, and that is simple to install.

In the following a non-locating bearing assembly including a bearing unit is disclosed that is configured to support a rotating component relative to a stationary component and includes a first stationary bearing ring and a second rotatable bearing ring. Here the rotating bearing ring is fixedly connectable to the rotating component. Such a fixed connectability can be induced by snap rings or a press fit.

In order to make possible a simplest-possible installation of the non-locating bearing assembly on the stationary component, the non-locating bearing assembly furthermore includes a bearing carrier that is fixedly connectable to the stationary component. In the bearing carrier, the stationary bearing ring is in turn attached such that it essentially does not rotate but is axially displaceable. It is advantageous here in particular when the non-locating bearing assembly is provided as a preinstalled unit made of a bearing carrier and a bearing unit. The entire non-locating bearing assembly can then easily be attached to the stationary component without the tolerances of the individual components having to be set separately and laboriously during installation.

This is advantageous in particular when not only a bearing unit, but further elements such as, for example, a spring element, are disposed in the non-locating bearing assembly. Such a spring element is, for example, provided to interact with the bearing carrier and the stationary bearing ring so that the axially displaceable stationary bearing ring is axially preloaded in the bearing carrier. Of course, however, it is also possible to provide a bearing carrier including a non-locating bearing assembly disposed therein, wherein no preinstalled unit is present, but rather wherein the bearing carrier is merely configured to receive the spring element, and the spring element preloads the stationary bearing ring only in the installed assembly situation.

According to a further advantageous exemplary embodiment, the bearing carrier furthermore includes a stop element that interacts with the spring element or the bearing ring in order to limit the axial mobility of the bearing ring. This is advantageous in particular for a preinstalled unit having a bearing carrier and a bearing ring since the stop element simultaneously prevents the bearing unit from falling out of the bearing carrier. In addition, using such a stop element, the preload of the non-locating bearing assembly can be pre-set overall during manufacturing so that a laborious adapting of the tolerances and preloads during installation can be avoided.

The bearing carrier and bearing unit are preferably manufactured from the same material, but it is also possible that they are manufactured from different materials, wherein, however, it is preferable to use materials that have similar coefficients of thermal expansion. The same thermal expansion conditions thereby prevail between the bearing carrier and the stationary bearing ring so that fit difficulties between the bearing carrier and the stationary bearing ring are prevented due to identical thermal expansions.

The bearing carrier itself can be configured essentially pot-shaped and include a flange configured as a pot rim that is equipped with at least one attachment element by which the bearing carrier is attachable to the stationary component. A particularly simple and fast installation of the non-locating bearing assembly, and in particular of the bearing carrier on the stationary component, is thereby possible. Depending on the design of the stationary component, of course, the pot base can also be configured as a flange and be connectable to the stationary component.

In order to make possible a rotationally fixed but axially displaceable attaching of the stationary bearing ring into the bearing carrier, according to a further advantageous exemplary embodiment the stationary bearing ring is attached to the bearing carrier in a rotationally fixed manner by an interference-fit attaching. The interference-fit attaching also ensures a non-rotational attaching of the stationary bearing ring in the bearing carrier, and thus to the stationary component, even in the event of strong rotational forces. Damage to the bearing due to creeping or co-rotation can thus be reliably prevented.

It is particularly preferred here when at least one first rotational securing element that is attached to the stationary bearing ring or is shaped thereon and at least one second rotational securing element that is attached to the bearing carrier or is shaped thereon, are provided, wherein the first and the second rotational securing elements interact in an interference-fit manner so that the stationary bearing ring is attached in the bearing carrier in a rotationally fixed manner. Due to the interacting of the two rotational securing elements, the interference fit is formed particularly well.

According to a further advantageous exemplary embodiment, the first or the second rotational securing element is configured as an axial groove, while the corresponding counter-piece, in this case the second or first rotational securing element, is configured as a projection that engages into the axial groove in an interference-fit manner. Here the axial groove ensures that the rotational securing element configured as a projection that engages into the axial groove is axially displaceable therein so that overall the stationary bearing ring is indeed attached in a rotationally fixed manner while allowing an axial mobility.

It is particularly advantageous when the projection is configured to be complementary to the groove. Small movements in the rotational direction between stationary bearing ring and bearing carrier can thereby also be prevented.

According to a further advantageous exemplary embodiment, the projection is formed via a staking, a bending, an embossing, or a similar shaping of the bearing carrier. Since in particular the bearing carrier can be configured as a relatively thin-walled pot-shaped element, such shapes can easily be introduced into the bearing carrier, which shapes in turn interact with the bearing ring. Of course, it would naturally also be possible to form a corresponding projection on the bearing ring during a machining process, which projection can in turn engage in a corresponding groove on the bearing carrier.

Alternatively or additionally it is naturally also possible to overmold a plastic element onto the bearing ring in an interference-fit manner, which plastic element includes the at least one projection that engages in a receptacle formed on the bearing carrier. It is advantageous here in particular to overmold the bearing ring as a whole on its outer surface facing the bearing carrier so that the overmolded plastic can engage in irregularities on the bearing ring and completely surround it.

According to a further preferred exemplary embodiment, it is equally possible to provide a separate additional rotational securing element that interacts with the bearing ring and the bearing carrier in an interference-fit manner. It is advantageous here in particular to spray the rotational securing element onto the bearing carrier in an interference-fit manner and/or to shape it in the receptacle on the bearing ring.

Such an overmolded projection is advantageous in particular in an exemplary embodiment wherein the bearing carrier is configured pot-shaped and the axial groove is configured as a continuous slit-shaped recess in the pot wall and/or the pot base and/or the pot rim of the bearing carrier. A crown-shaped bearing carrier thereby arises, including wide recesses into which the overmolded projections of the plastic element can engage. Since in particular with plastic the rotational forces can lead to damage to the projection, in such a design the force can be distributed over many projections over a larger area so that a secure attaching of the bearing ring in the bearing carrier is possible even with high rotational forces. An exemplary embodiment is thus advantageous wherein the stationary bearing ring includes projections shaped on the bearing ring or where a rotational securing element that is connected to the bearing ring such that they are rotationally fixed includes projections, wherein the projections are configured to be received by the slit-shaped recesses of a prong-shaped bearing carrier.

Of course it is naturally also possible to only provide a single/small-surface lug-shaped projection on the plastic element, which lug-shaped projection engages into a single groove. This is advantageous in particular with non-locating bearing assemblies that are rotationally lightly loaded.

In addition to the prong-shaped design of the bearing carrier, it is also advantageous to form only one groove, axially delimited on both sides, on the bearing carrier, or even a through-opening, in particular a slot, to receive the projection. Such recesses, in particular slots, are simple to manufacture and provide a good receptacle for the projection. It is advantageous here in particular when the projection is configured such that it can snap into the opening during an installation process.

In a particularly simple exemplary embodiment, the interference-fit between bearing carrier and bearing ring is only provided via a certain ovality or waviness of the attachment partners. Since usually neither bearing ring nor bearing carrier can be shaped ideally round, this manufacturing-related inaccuracy can also be used to provide an interference fit between the bearing ring and the bearing carrier.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

Figure 1:
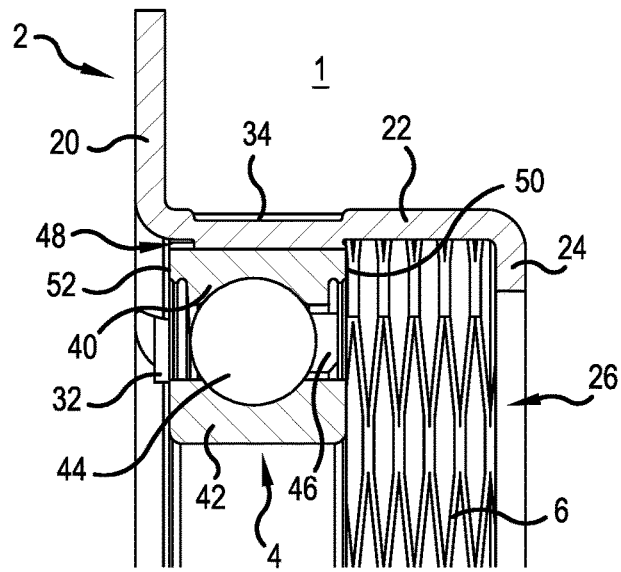
FIG. 1 is sectional side elevational view of a non-locating bearing assembly, which includes a bearing and a bearing carrier, according to a first embodiment of the present disclosure.

In the following, identical or functionally equivalent elements are designated by the same reference numbers.

The appended Figures show preferred exemplary embodiments of a non-locating bearing assembly 1 including a bearing carrier 2 in which a bearing unit 4 and a spring element 6 are disposed. The exemplary embodiments depicted show a non-locating bearing assembly 1 that can be used, for example, for supporting a shaft in a housing, wherein the housing is stationary and the shaft is rotating. Of course, the non-locating bearing assembly 1 is also usable in other applications, for example, a stationary pin and a rotating housing.

It is advantageous here in particular when the bearing carrier 2 and the bearing unit 4 are manufactured from the same material, or at least from materials having identical or similar coefficients of thermal expansion. Fit changes in operation can thereby be prevented.

In the depicted exemplary embodiments, the bearing carrier 2 is configured pot-shaped and includes a pot rim configured as a flange 20, a pot wall 22, and a pot base 24. The pot base 24 includes a large recess 26 in order to attach the non-locating bearing assembly 1 to the movable component (not depicted). Furthermore, the bearing carrier 2 includes attachment elements 28 that are preferably disposed equally spaced around the flange 22. The attachment elements 28 can be configured as through-holes that are suitable for receiving screws. Of course, other attachment elements are also possible, such as, for example, threaded through-stems or separate inserts.

The bearing unit 4 comprises a bearing outer ring 40 that is configured in the depicted exemplary embodiment as a stationary bearing ring, and a bearing inner ring 42 that is rotatable, which are disposed spaced with respect to each other and configured to receive rolling elements 44 between them that are guided and held uniformly spaced by a cage 46. As mentioned above, the exemplary embodiments are suited in particular for a shaft bearing assembly in a housing in which the outer ring is disposed substantially rotationally fixed but axially displaceable. However, it is equally possible to form the bearing inner ring axially displaceable. Such a design is advantageous in particular with rotating housings, such as, for example, a hollow shaft.

In the disclosed exemplary embodiments the bearing unit is furthermore configured as a ball bearing, but all other types of rolling-element bearings and plain bearings are also possible.

Furthermore, it can be seen from the Figures that in addition to the bearing unit 4 a spring element 6 is also disposed in the bearing carrier 2. This spring element 6 ensures that the bearing outer ring 40 is preloaded in the bearing carrier 2. Here one end of the spring element 6 is supported on one side on the pot base 24 of the bearing carrier 2 and the other end is supported on an end side 50 of the bearing outer ring 40.

In order to in particular provide a preinstalled non-locating bearing assembly 1, the bearing carrier 2 can furthermore be equipped on the flange side with a stop 32 that contacts and supports the bearing outer ring 40 on its other end side 52. It is thereby also possible to arrange the bearing unit overall in an already preloaded rest position in the bearing carrier 2. At the same time the entire non-locating bearing assembly 1 can be attached to a stationary component without having to take account of tolerances so that a particularly simple installation is possible. A shaft spring made of a flat wire is preferably used as the spring element 6. However, every other type of spring element 6 is also equally possible, such as, for example, a plate spring.

As mentioned above, in the disclosed exemplary embodiments, the non-locating bearing assembly 1 is a non-locating bearing assembly in which the outer ring 40 is rotationally fixed but axially displaceable, while the bearing inner ring 42 is rotatably connected to a shaft not depicted here. In contrast, the bearing carrier 2 that receives the bearing unit 4 is rotationally fixed and also axially fixed (not axially displaceable) with respect to a housing (not depicted) in which the non-depicted shaft is supported.

Figure 2:
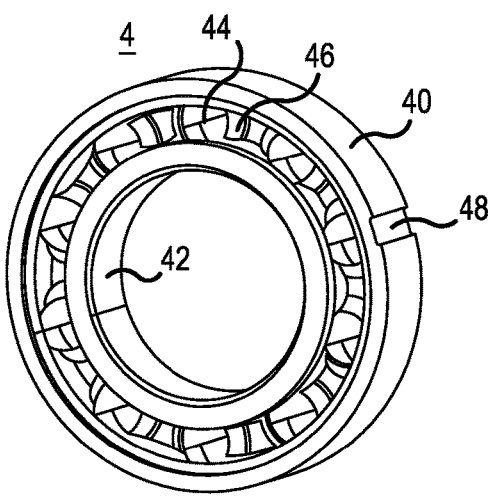
FIG. 2 is a perspective view of the bearing of FIG. 1.
Figure 3:
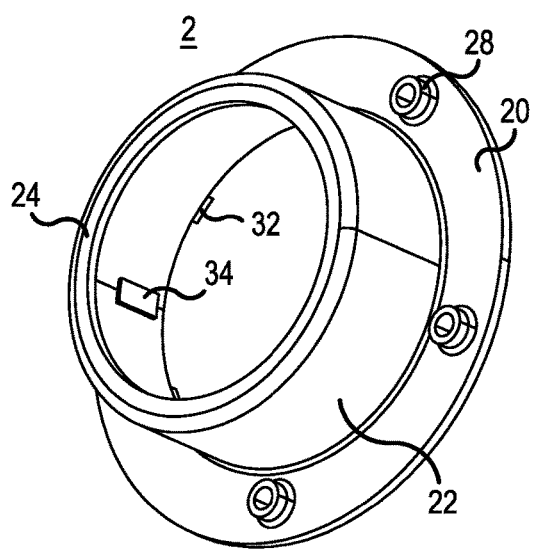
FIG. 3. is perspective view of the bearing carrier of FIG. 1.

In order to attach the bearing unit 4 in the bearing carrier 2 such that it is axially displaceable but rotationally fixed, in the exemplary embodiment depicted in FIG. 1 and in detail in FIG. 2 the bearing outer ring 40 includes an axially extending groove 48 as a first rotational securing element that interacts with an embossing (or projection) 34 on the bearing carrier 2, which embossing 34 is configured as a second rotational securing element. The projection configured as the embossing 34 on the bearing carrier 2 can also be seen in FIG. 3. Such an embossing 34 can easily be manufactured by a corresponding embossing tool. Since in particular the walls (here the pot wall 22) of the bearing carrier 2 are relatively thin, such an embossing 34 is easy to produce. The shape of the embossing 34 essentially corresponds to the groove 48 as can be seen in a comparison of FIGS. 2 and 3.

Figure 4:
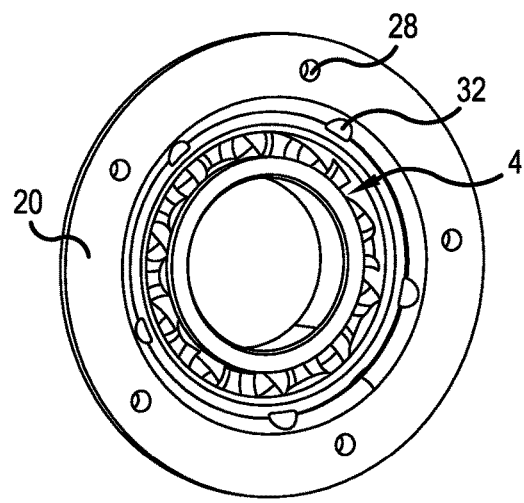
FIG. 4 is a perspective view of the bearing of FIG. 2. mounted in the bearing carrier of FIG. 3.
Figure 5:
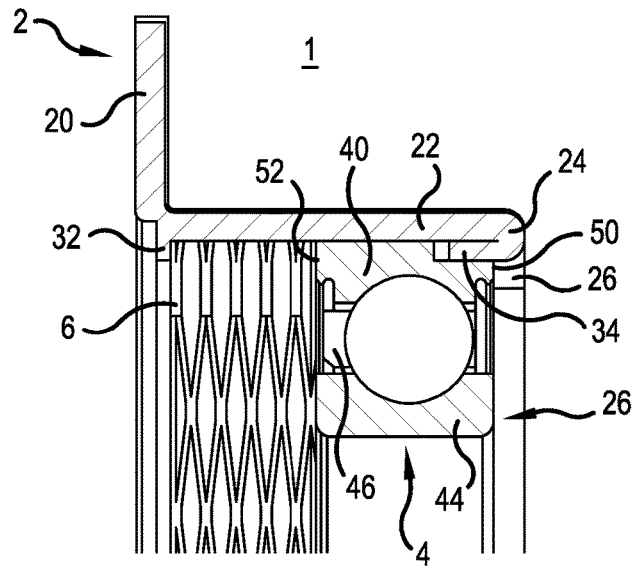
FIG. 5 is sectional side elevational view of a non-locating bearing assembly, which includes a bearing and a bearing carrier, according to a second embodiment of the present disclosure.

In order to limit the axial mobility of the bearing unit 4 in the bearing 2, and to provide a preinstalled unit made of the bearing carrier and the bearing and spring element, stakings 32 are furthermore formed on the bearing carrier 2 (see in particular FIG. 4) that are formed after installation of the spring element 6 and the bearing unit 4, and axially secure the bearing 4 in the bearing carrier 2. Here the bearing 4 can be installed in a preload position against the spring 6, but it is also possible to provide the spring in the bearing carrier 2 in the unloaded state.

In the exemplary embodiment depicted in FIGS. 1 to 4, one side the spring element 6 abuts against the base region 24 of the bearing carrier 2, and the other side acts against the end surface 50 of the bearing outer ring 40. The staking 32 preferably interacts with the other end surface 52 of the bearing outer ring 40.

FIGS. 5 to 8 show a further preferred exemplary embodiment of a non-locating bearing assembly 1 in which a bearing unit 4 is also disposed again in a bearing carrier 2, and furthermore in which a spring element 6 is provided for the preload. However, in contrast to the exemplary embodiment depicted in FIGS. 1 to 4, the position of the bearing unit 4 and of the spring element 6 in the bearing carrier 2 is exchanged. One side of the spring element 6 thus abuts against the end surface 52 of the bearing outer ring 40 and the other side abuts against the stop 32 that is formed from the bearing carrier 2 by a corresponding staking.

In order to ensure the axially displaceable but rotationally fixed arrangement of the bearing outer ring 40 in the bearing carrier 2, in the exemplary embodiment depicted in FIGS. 5 to 8, an axial groove 48 is also formed in the bearing outer ring into which groove 48, however, a projection 34 formed by a bending over of a portion of the base region 24 is received. This projection 34 interacts again with the groove 48 so that a rotationally fixed connection is produced. Here the projection 34 is in turn configured complementary to the groove 48, as can be seen from the views of the bearing ring from FIG. 6 and of the bearing carrier in FIG. 7. FIG. 8 also shows again the protruding bending 34 in the base region 24 of the bearing carrier 2 in its state received in the groove 48.

Figure 9:
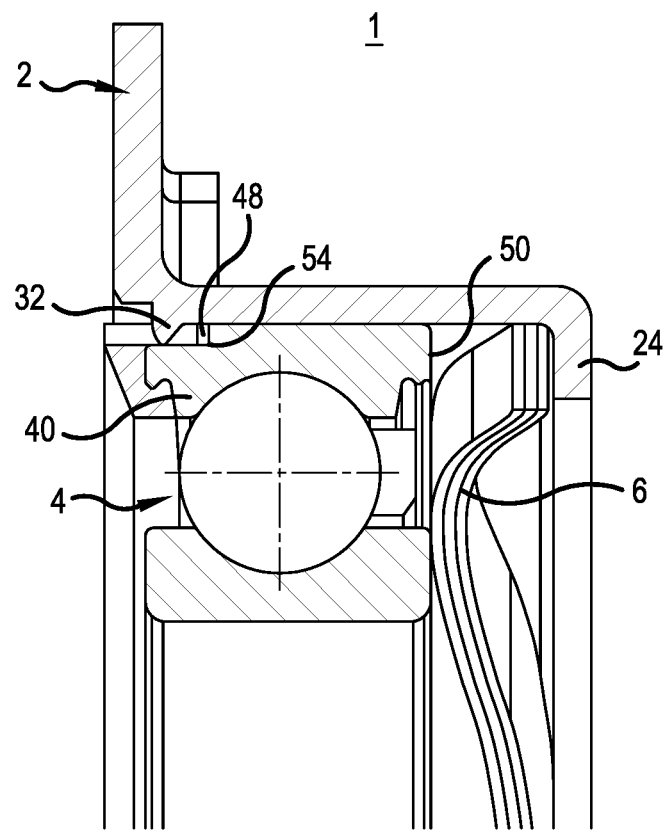
FIG. 9 is a sectional side elevational view of a third embodiment of the disclosure.

FIG. 9 shows a further preferred exemplary embodiment of a non-locating bearing assembly 1 in which the staking 32 on the bearing carrier ensures both an axial limiting of mobility and a rotationally fixed attaching of the bearing outer ring 40 in the bearing carrier 2. For this purpose a groove 48 is in turn formed on the bearing outer ring 40 into which groove 48 the staking 32 engages in this exemplary embodiment. Since the groove 48 does not extend over the entire length of the bearing outer ring, but rather only up to a certain region, in this case the step 54, the bearing outer ring is also captively attached in the bearing carrier 2.

Furthermore, FIG. 9 shows a further exemplary embodiment for the spring element 6. While in FIGS. 1 to 8 the spring element 6 is manufactured as a shaft spring from a flat wire, in FIG. 9 an annular plate spring is provided as spring element 6. One side of this plate spring 6 is supported on one side of the base region 24 of the bearing carrier 2 and the other side is supported on the end surface 50 of the bearing outer ring 40.

In addition to the rotational securing elements being disposed on the bearing carrier 2 or on the bearing ring 40 itself, it is also possible to provide a separate connecting element 60 that in the exemplary embodiments depicted is attached to the bearing ring 40 in an interference-fit manner and engages into a corresponding element on the bearing carrier 2 in an interference-fit manner. Of course it is naturally also possible to attach the connecting element 60 to the bearing carrier 2 and to bring it into interference-fit interaction with the bearing ring 40.

FIGS. 10 to 17 show two different exemplary embodiments for such a connecting element 60 that interacts with both the bearing ring 40 and with the bearing carrier 2 in an interference-fit manner and thus provides the interference-fit attaching of the bearing ring 40 in the bearing carrier 2.

Figure 10:
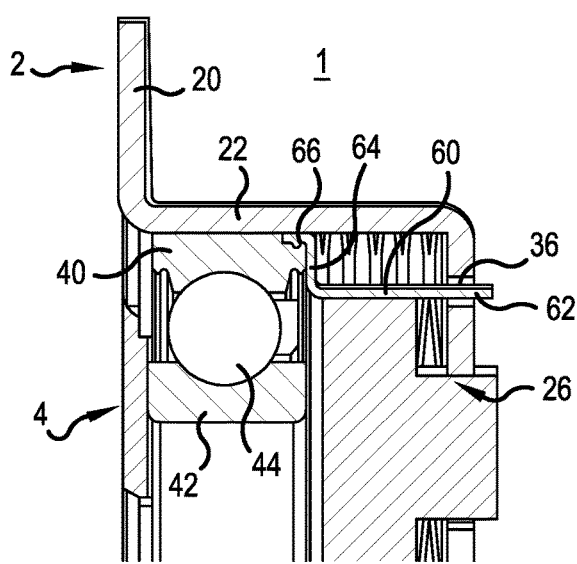
FIG. 10 is sectional side elevational view of a non-locating bearing assembly, which includes a bearing and a bearing carrier, according to a fourth embodiment of the present disclosure.
Figure 11A:
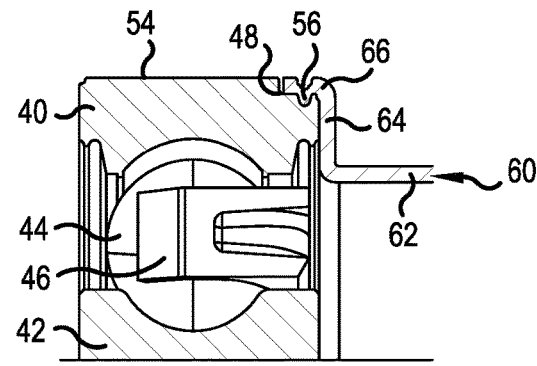
FIGS. 11a and 11b are side elevational views of two portions of the bearing assembly of FIG. 10.
Figure 11B:
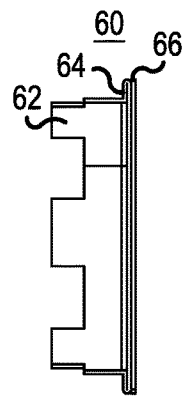

FIG. 10 shows a construction of the non-locating bearing assembly 1 analogous to that depicted in FIGS. 1 to 8. However, for the rotationally fixed connection, the connecting element 60 is attached to the bearing outer ring 40 (depicted in more detail in FIGS. 11a+11b) that is fixedly connected to the bearing outer ring, in particular in an interference-fit manner. Furthermore, the connecting element 60 has a crown shape, including axially extending prongs 62, a radially extending annular region 64, and a flange region 66, wherein the radially extending annular region 64 extends along the end surface 50 of the bearing outer ring 40. As can furthermore be seen from FIG. 10, the bearing ring 40 furthermore includes a groove 48 that extends in an edge region between radial the surface 54 and the end surface 50 of the bearing outer ring. The flange 66 of the connecting element 60 is molded into this groove 48 in an interference-fit manner, for example, by staking or beading or rolling-in. For this purpose the groove 48, as can be seen in particular from the detail view of FIG. 11a, can include additional structures 56 wherein the material of the flange region 66 can be received.

In order to also attach the bearing ring 40 to the bearing carrier 2 such that they are rotationally fixed, recesses 36 are furthermore provided in the base region 24 of the bearing carrier 2, wherein the axially extending prongs 62 of the connecting element 60 are receivable. The recesses 36 thus form the second rotational securing element, while the groove 48 forms the first rotational securing element with the structure 56 and the flange 66.

Figure 12:
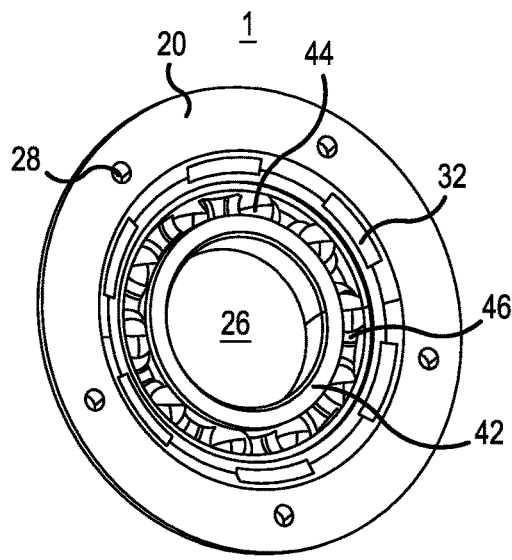
FIG. 12 is a first perspective view of the bearing assembly of FIG. 10.
Figure 13:
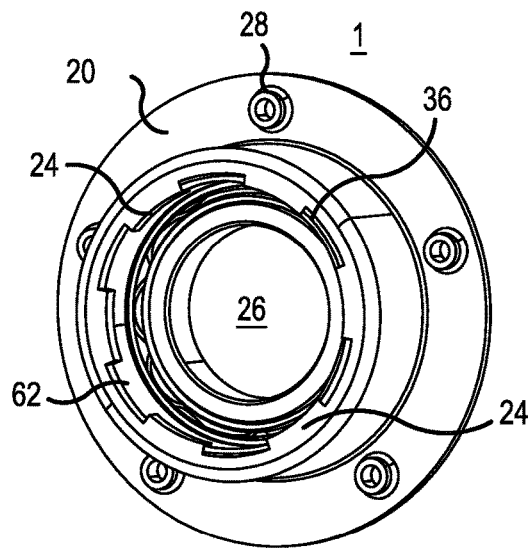
FIG. 13 is a second perspective view of the bearing assembly of FIG. 10.

For limiting the axial mobility of the bearing ring 40 even in the preloaded state by the spring element 6, stakings 32 are in turn provided, as can be seen in particular from FIGS. 10 and 12. The receiving of the prong-shaped elements 62 in the recesses 36 on the bearing carrier can also be seen in particular from FIG. 13.

FIGS. 14 to 17 show a further preferred exemplary embodiment for a non-locating bearing assembly 1 including a connecting element 60. As can be seen in particular from FIG. 14, a connecting element 60 is applied onto the bearing outer ring of the bearing unit 4. This applying is preferably effected by overmolding so that the connecting element 60 is attached to the outer ring 40 of the bearing unit 4 in an interference-fit manner. Of course other attaching options are also possible, such as, for example, also material attachment options, in particular adhering. The connecting element 60 can preferably be manufactured from plastic, but it is also possible to manufacture the connecting element 60 from a metallic material.

Figure 14:
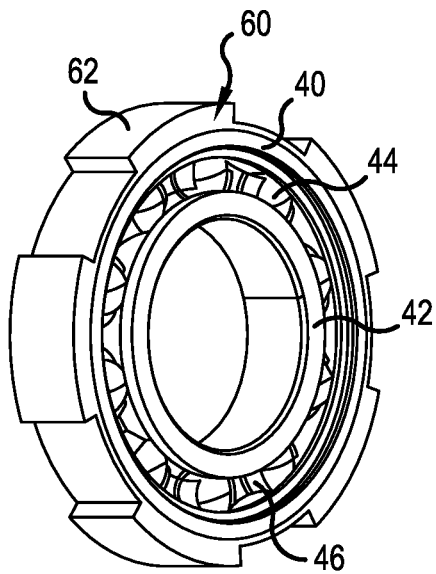
FIG. 14 is a perspective view of a non-locating bearing assembly, which includes a bearing and a bearing carrier, according to a fifth embodiment of the present disclosure.
Figure 15:
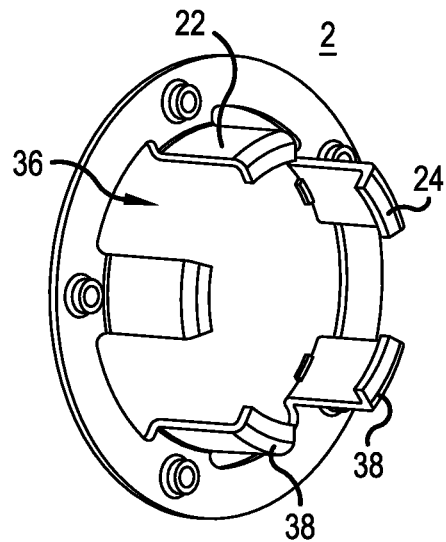
FIG. 15 is a perspective view of the bearing carrier of FIG. 14.

However, since there is a risk, particularly with plastic, that small-surface rotational securing elements may be sheared off with high circumferential loads, in the exemplary embodiment of FIG. 14 a plurality of rotational securing elements 62 are configured as large-surface teeth. These large-surface toothings 62 in turn interact with recesses 36 in the bearing carrier 2. FIG. 15 shows an associated bearing carrier 2 that is essentially pot-shaped, equipped with a flange region, a pot wall region 22, and a pot base region 24. However, since the recesses 34 extend from the flange 22 to the base region 24, the bearing carrier shows a crown shape including prong elements 38 separated by the recess 36.

Figure 16:
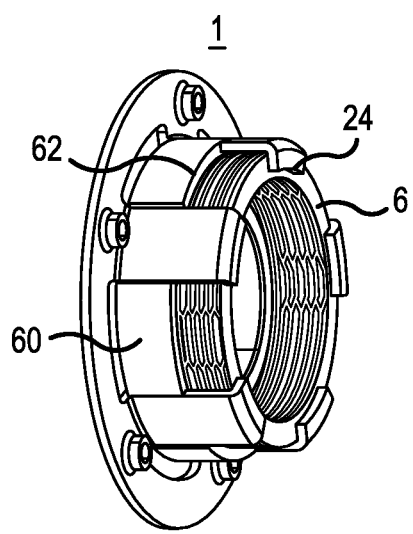
FIG. 16 is a perspective view of the bearing carrier of FIG. 14 including a spring element.
Figure 17:
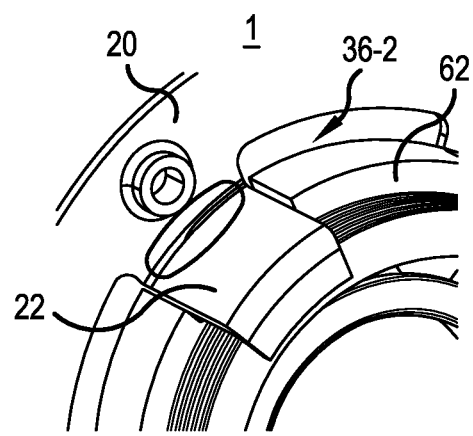
FIG. 17 is a detail view of a portion of FIG. 16.

In the installation situation as is depicted in FIGS. 16 and 17, as is already known a spring element 6 that ensures a preloaded axial supporting of the bearing ring 40 is also provided in addition to the bearing ring including the connecting element 60. One side the spring element 6 in turn abuts against the base region 24 and the other side contacts the end surface 50 of the bearing outer ring and the overmolded connecting element 60. Due to the recess region 36-2 formed in the flange 20 (see FIG. 17), the recess 36 extending in the flange region makes it possible that the bearing ring 40 including the overmolded connecting element 60 and the prongs 62 is insertable into the bearing carrier 2.

In order to limit an axial mobility of the bearing 4 in the bearing carrier 2 and to provide a preassembled unit, a staking 32 not depicted in the Figures is in turn provided at the transition between flange region 20 and wall surface 22, which staking 32 ensures the axial attaching of the bearing.

Figure 6:
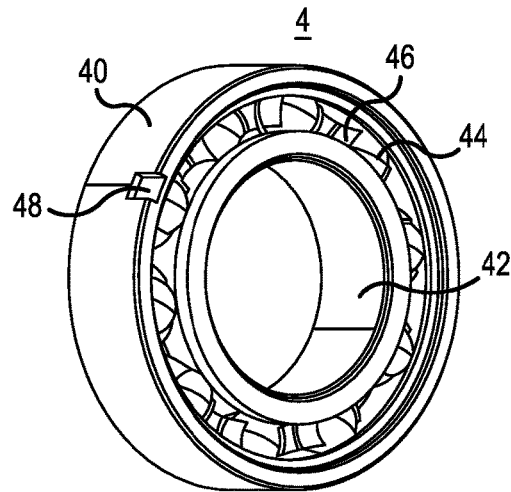
FIG. 6 is a perspective view of the bearing of FIG. 5.
Figure 7:
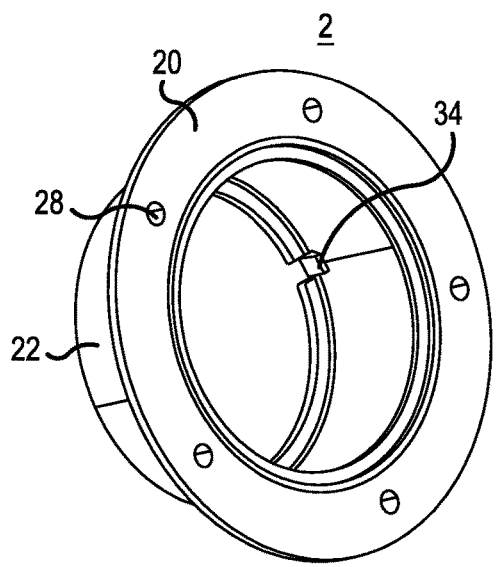
FIG. 7 is perspective view of the bearing carrier of FIG. 5.
Figure 8:
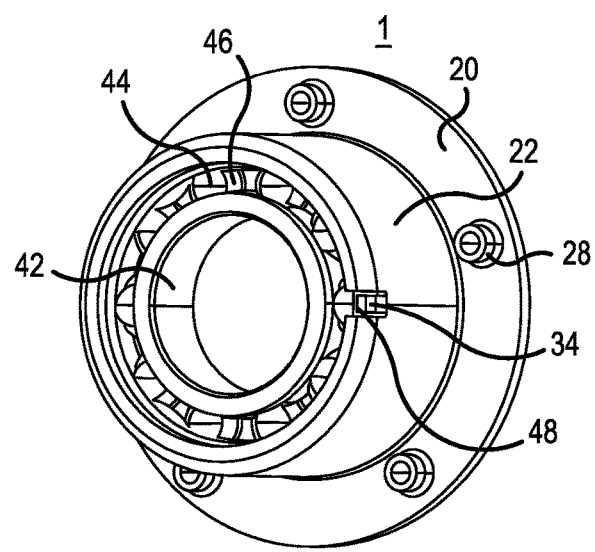
FIG. 8 is a perspective view of the bearing of FIG. 6 mounted in the bearing carrier of FIG. 7.

It is to be noted overall that all exemplary embodiments and the features shown therein can also be present combined with one another differently. Thus a plate spring, as depicted in FIG. 6, can always be used instead of the shaft spring. The arrangement of the bearing unit 4 and the spring element 6 is also arbitrarily selectable. It is furthermore possible to provide a corresponding spring element 6 on both sides of the bearing 4. Instead of the staking forming the stop 32, other possibilities for providing a stop 32 or an axial movement limitation of the bearing ring are also included within the scope of protection.

Overall, using the disclosed non-locating bearing assembly 1 a simple to handle unit can be provided that can be directly installed in its entirety without having to take account of tolerances of the housing, shaft, bearing, snap ring, elastomer ring, and spring. Using an entirely preassembled unit also reduces the installation time and thus installation costs. Since the bearing carrier 2 and the bearing unit 4 are manufactured from the same material, or from materials that thermally expand in a similar manner, a drastic reduction of the negative influence of different temperature-dependent expansions of bearing and light metal of a housing can be achieved.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Non-locating bearing assembly
2 Bearing carrier
20 Flange
22 Pot wall
24 Pot base
26 Recess
28 Attachment element
30 Abutment surface
32 Stop
34 Rotational securing element—embossing
36 Recess
38 Prong element
4 Bearing unit
40 Bearing outer ring
42 Bearing inner ring
44 Rolling element
46 Cage
48 Rotational securing element—groove
50; 52 End surfaces of the bearing ring
54 Step
56 Structure
6 Spring
60 Connecting element
62 Rotational securing element—prong
64 Annular region
66 Flange region

What is claimed is:

1. A non-locating bearing assembly comprising:
a bearing unit configured to support a rotatable component relative to a stationary component, the bearing unit including a first stationary bearing ring and a second rotatable bearing ring, the rotatable bearing ring being fixedly connectable to the rotatable component,
a bearing carrier having a cylindrical wall containing the bearing unit and a base wall extending radially inwardly from the cylindrical wall and having at least one recess, the bearing carrier being configured to be fixedly connected to the stationary component, and
an annular connecting element disposed axially between the bearing unit and the base wall and having a first axial end attached to the stationary bearing ring and a second axial end provided by at least one axial prong, the at least one axial prong extending through the at least one recess in the base wall such that the stationary bearing ring is attached to the carrier in a rotationally fixed but axially displaceable manner.

2. The non-locating bearing assembly according to claim 1,
wherein the stationary bearing ring has a circumferential groove and the annular connecting element has a flange region at the first axial end, the flange region of the connecting element being engaged with the groove in the stationary bearing ring.

3. The non-locating bearing assembly according to claim 1,
wherein the non-locating bearing assembly is configured as a pre-installable unit.

4. The non-locating bearing assembly according to claim 1,
including a spring disposed in the bearing carrier, the spring being located between an end of the bearing carrier and a side of the bearing outer ring to axially preload the bearing unit relative to the bearing carrier.

5. The non-locating bearing assembly according to claim 4,
including a stop on the bearing carrier, the stop being configured to interact with the spring or the bearing outer ring to limit an axial displacement of the bearing outer ring.

6. A non-locating bearing assembly comprising:
a bearing unit configured to support a rotatable component relative to a stationary component, the bearing unit including a stationary outer bearing ring and a rotatable inner bearing ring, the bearing inner ring being fixedly connectable to the rotatable component,
a bearing carrier including a flange fixedly connected to the stationary component, a plurality of prong elements extending axially from the flange, and a plurality of holes each defined between a separate pair of adjacent prongs; and
an annular connecting element disposed about the bearing outer ring and including a plurality of spaced apart toothings extending radially outwardly from the bearing outer ring, each one of the plurality of prongs of the bearing carrier being disposed between each pair of adjacent toothings and each toothing of the connecting element being disposed within a separate one of the holes of the carrier such that the bearing outer ring is attached to the carrier in a rotationally fixed but axially displaceable manner.

7. The non-locating bearing assembly according to claim 6, wherein the non-locating bearing assembly is configured as a pre-installable unit.

8. The non-locating bearing assembly according to claim 6,
   wherein each one of the prong elements of the carrier has a first axial end connected with the flange, an opposing second axial end and a radially inwardly extending projection at the second axial end, and
   a spring is disposed in the bearing carrier, the spring being located between the projections of the prong elements of the bearing carrier and a side of the bearing outer ring to axially preload the bearing unit relative to the bearing carrier.

9. The non-locating bearing assembly according to claim 8,
   including a stop on the bearing carrier, the stop being configured to interact with the spring or the bearing outer ring to limit an axial displacement of the bearing outer ring.

* * * * *